US011248692B2

(12) United States Patent
White et al.

(10) Patent No.: US 11,248,692 B2
(45) Date of Patent: Feb. 15, 2022

(54) COMPOSITE GEARS AND METHODS OF MANUFACTURING SUCH GEARS

(71) Applicant: Deere & Company, Moline, IL (US)

(72) Inventors: John J. White, Moline, IL (US); Paul W. Johnson, New Hartford, IA (US); Eric M. Johnson, Geneseo, IL (US); Jeremy J. Wagner, Denver, IA (US); Roman Cisek, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 458 days.

(21) Appl. No.: 15/067,767

(22) Filed: Mar. 11, 2016

(65) Prior Publication Data

US 2017/0261087 A1 Sep. 14, 2017

(51) Int. Cl.
| | | |
|---|---|---|
| F16H 55/06 | (2006.01) |
| B23K 9/23 | (2006.01) |
| B23K 26/342 | (2014.01) |
| B23K 15/00 | (2006.01) |
| B23K 9/04 | (2006.01) |
| B23K 31/02 | (2006.01) |
| F16H 55/17 | (2006.01) |
| B23K 101/00 | (2006.01) |

(Continued)

(52) U.S. Cl.
CPC ............ *F16H 55/06* (2013.01); *B23K 9/04* (2013.01); *B23K 9/232* (2013.01); *B23K 15/0086* (2013.01); *B23K 15/0093* (2013.01); *B23K 26/342* (2015.10); *B23K 31/02* (2013.01); *F16H 55/17* (2013.01); *B23K 2101/008* (2018.08); *B23K 2103/04* (2018.08); *B23K 2103/18* (2018.08)

(58) Field of Classification Search
CPC ......... F16H 55/06; F16H 55/17; B23K 31/02; B23K 2201/008; B23K 2203/18; B23K 9/232; B23K 9/04; B23K 26/342; B23K 15/0086; B23K 15/0093; B23K 2103/04; B22D 13/04; B22D 19/085
See application file for complete search history.

(56) References Cited

U.S. PATENT DOCUMENTS

| | | | | |
|---|---|---|---|---|
| 820,789 | A * | 5/1906 | Hutchins | F04C 2/084 |
| | | | | 74/460 |
| 2,064,144 | A * | 12/1936 | Benge | F16H 55/06 |
| | | | | 74/445 |

(Continued)

FOREIGN PATENT DOCUMENTS

| | | |
|---|---|---|
| CN | 101802457 A | 8/2010 |
| CN | 103568700 A | 2/2014 |

(Continued)

OTHER PUBLICATIONS

German Patent and Trade Mark Office, Search Report for German Patent Application No. 10 2017 203 966.3 dated Nov. 10, 2017.

(Continued)

*Primary Examiner* — Zakaria Elahmadi
(74) *Attorney, Agent, or Firm* — Klintworth & Rozenblat IP LLP

(57) ABSTRACT

A gear includes an inner portion formed from a first material; an outer portion formed from a second material melted and solidified onto the inner portion; and a plurality of teeth formed in the outer portion after the second material has solidified.

18 Claims, 5 Drawing Sheets

(51) Int. Cl.
*B23K 103/18* (2006.01)
*B23K 103/04* (2006.01)

(56) References Cited

U.S. PATENT DOCUMENTS

| | | | | |
|---|---|---|---|---|
| 2,064,723 | A * | 12/1936 | Benge | F16H 55/06 |
| | | | | 74/445 |
| 2,331,909 | A * | 10/1943 | Hensel | B21K 1/30 |
| | | | | 428/553 |
| 2,704,465 | A * | 3/1955 | Haller | F16H 55/06 |
| | | | | 74/434 |
| 3,156,589 | A * | 11/1964 | Klement | B22D 13/04 |
| | | | | 148/522 |
| 3,461,737 | A * | 8/1969 | Lukawich | F16H 55/06 |
| | | | | 74/443 |
| 3,772,935 | A * | 11/1973 | Dunn | B22F 7/06 |
| | | | | 74/434 |
| 4,472,164 | A * | 9/1984 | Pusch | B62D 55/125 |
| | | | | 305/199 |
| 4,674,351 | A * | 6/1987 | Byrd | F16D 3/76 |
| | | | | 464/90 |
| 5,074,828 | A * | 12/1991 | Ellis | F16H 55/06 |
| | | | | 474/161 |
| 5,497,548 | A * | 3/1996 | Schlenger | B29C 70/085 |
| | | | | 242/430 |
| 5,852,951 | A * | 12/1998 | Santi | F16H 55/06 |
| | | | | 74/443 |
| 5,927,149 | A * | 7/1999 | Moody | F16H 55/14 |
| | | | | 464/89 |
| 6,023,990 | A | 11/2000 | Carr et al. | |
| 6,626,261 | B1 * | 9/2003 | Kurokawa | B62D 5/0409 |
| | | | | 180/444 |
| 7,383,750 | B2 * | 6/2008 | Menjak | B23P 15/14 |
| | | | | 74/409 |
| 7,814,809 | B2 * | 10/2010 | Shinohara | F16H 55/06 |
| | | | | 74/443 |
| 8,070,632 | B2 * | 12/2011 | Yuan | F16H 55/14 |
| | | | | 474/94 |
| 9,388,476 | B2 * | 7/2016 | Obayashi | C23C 8/80 |
| 9,528,558 | B2 * | 12/2016 | Sin | C22C 38/44 |
| 2006/0005652 | A1 * | 1/2006 | Kurokawa | F16H 55/06 |
| | | | | 74/425 |
| 2007/0089555 | A1 * | 4/2007 | Tomoda | F16H 55/06 |
| | | | | 74/443 |
| 2009/0081402 | A1 * | 3/2009 | Tomoda | F16H 55/06 |
| | | | | 428/66.1 |
| 2009/0199381 | A1 * | 8/2009 | Maruyama | H02N 2/106 |
| | | | | 29/25.35 |
| 2010/0031764 | A1 * | 2/2010 | Derse | F16H 55/14 |
| | | | | 74/457 |
| 2012/0037611 | A1 * | 2/2012 | Karlsen | F16L 1/123 |
| | | | | 219/528 |
| 2012/0132024 | A1 * | 5/2012 | Mittermair | F16H 55/06 |
| | | | | 74/421 R |
| 2012/0247249 | A1 * | 10/2012 | Obayashi | H01L 51/052 |
| | | | | 74/434 |
| 2012/0297911 | A1 * | 11/2012 | Geiman | B21K 1/30 |
| | | | | 74/434 |
| 2013/0195545 | A1 * | 8/2013 | Tsuchida | F16H 55/17 |
| | | | | 403/270 |
| 2013/0220005 | A1 * | 8/2013 | Kawano | F03D 1/0675 |
| | | | | 73/112.01 |
| 2013/0220050 | A1 * | 8/2013 | Koike | F16H 55/06 |
| | | | | 74/439 |
| 2013/0319154 | A1 * | 12/2013 | Obayashi | C22C 38/18 |
| | | | | 74/434 |
| 2014/0252843 | A1 * | 9/2014 | Cox | E21D 9/104 |
| | | | | 299/79.1 |
| 2015/0021815 | A1 * | 1/2015 | Albrecht | B05B 7/22 |
| | | | | 264/235 |
| 2015/0183065 | A1 * | 7/2015 | Chavdar | B21K 1/30 |
| | | | | 74/460 |
| 2015/0328680 | A1 | 11/2015 | Tuffile et al. | |
| 2016/0016368 | A1 * | 1/2016 | Kunishima | F16H 55/06 |
| | | | | 74/434 |
| 2018/0017150 | A1 * | 1/2018 | Leupold | F16H 55/14 |

FOREIGN PATENT DOCUMENTS

| | | | | |
|---|---|---|---|---|
| CN | 103691959 A | | 4/2014 | |
| CN | 105364065 A | | 3/2016 | |
| JP | H1046356 A | | 2/1998 | |
| WO | 2014116254 A1 | | 7/2014 | |
| WO | WO-2014116254 A1 * | | 7/2014 | F16H 55/06 |

OTHER PUBLICATIONS

Thermal spraying, retrieved from: <URL: https://en.wikipedia.org/wiki/Thermal_spraying> on Aug. 26, 2015, 9 pages.

Chinese Office Action issued in counterpart application No. 201710068256.X dated Feb. 2, 2021 (10 pages).

Chinese Office Action issued in counterpart application No. 201710068256.X dated Oct. 18, 2021 with machine translation (16 pages).

* cited by examiner

COMPOSITE GEARS AND METHODS OF MANUFACTURING SUCH GEARS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to gears and more specifically relates to bimetallic gears and methods for manufacturing bimetallic gears.

BACKGROUND OF THE DISCLOSURE

Gears are used in work vehicles and other types of machine applications to transmit torque, such as within a vehicle transmission assembly. Conventionally, gears are formed in casting processes that may limit the number and types of material from which the gears may be made. The use of certain materials may render characteristics (e.g., hardness, wear resistance, etc.) of the gear to be suboptimal for certain applications.

SUMMARY OF THE DISCLOSURE

The disclosure provides improvements in multi-material gears (bimetallic gears and so on) and methods for manufacturing such gears that may result in enhanced gear properties.

In one aspect the disclosure provides a gear that includes an inner portion formed from a first material; an outer portion formed from a second material melted and solidified onto the inner portion; and a plurality of teeth formed in the outer portion after the second material has solidified.

In another aspect the disclosure provides a method of forming a gear. The method includes forming an inner portion of a gear from a first material; melting a second material and solidifying the melted second material onto the first material forming an outer portion of the gear; and forming teeth in the outer portion of the gear after the second material had solidified.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed multi-material gear, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted, the following describes one or more examples of composite or multi-material gears and methods for manufacturing such gears. As used herein, the terms "composite" and "multi-material" refer to an element that includes at least two different constituent materials, including two or more different metallic and non-metallic materials, having one or more different material properties. In certain cases, the various constituent materials combine (e.g., physically, chemically, etc.) in a manner to produce, at least in part, another material with one or more material properties different than that of the constituent materials. As also used herein, the term "gear" refers to any component that is used in the transmission of torque, including any of various known configurations such as internal gears, helical gears, skew gears, bevel gears, hypoid gears, crown gears, worm gears, non-circular gears, rack and pinion arrangements, sun and planet arrangements, harmonic gears, and cage gears. Further, the discussion below references a cylindrical coordinate system with axial, radial, and circumferential orientations. Generally, the examples below provide gears with enhanced or desired characteristics relative to conventional approaches.

Figure 1:
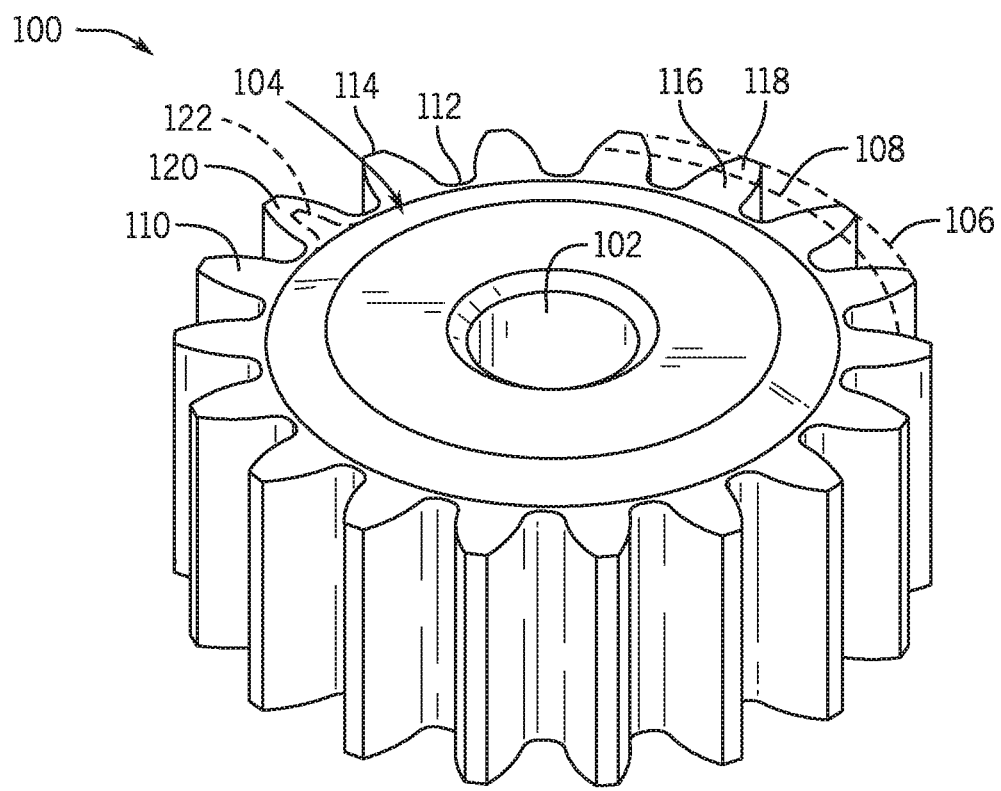
FIG. 1 is a perspective view of a gear in accordance with an example embodiment.

Referring to FIG. 1, in some embodiments, a gear 100 may be considered to include a number of characteristics common in the gear industry that will be referenced in the discussion below. Generally, the gear 100 is a rotating machine part having teeth 110 that mesh with another toothed part (not shown) to transmit torque. The gear 100 may be incorporated into any suitable larger machine or vehicle system, such as a vehicle transmission assembly or any application in which torque is transmitted.

The example gear 100 in FIG. 1 is a spur or straight-cut gear with a bore 102 that enables the gear 100 to be mounted on a shaft (not shown). Although a spur gear is depicted in FIG. 1, other embodiments may be applicable to any type of gear or gear element, as noted above. As shown, the gear 100 may include an inside cylinder (or disc) 104 from which the teeth 110 project in a radial direction. An outside cylinder 106 (partially shown) is considered the surface that coincides with the tips (or apices) of the teeth 110. Additionally, the gear 100 may be defined with a pitch circle 108 (partially shown) that corresponds to an imaginary circle in which the gear 100 rolls without slip.

The teeth 110 may be separated from one another by bottom lands 112 along the surface of the inside cylinder 104, and the teeth 110 have top lands 114 formed in the outer periphery of the outside cylinder 106. Each tooth 110 may be considered to have a dedendum 116 and an addendum 118. As schematically labeled on one tooth 110, the dedendum 116 of the tooth 110 extends from the bottom land 112 to the pitch circle 108, and the addendum 118 of the tooth 110 extends from the pitch circle 108 to the top land 114. As also schematically labeled on one tooth 110, each tooth 110 may be considered to have a tooth surface 120 and tooth core 122.

As described in greater detail below, the gear 100 may be formed with two, three, or more different materials selected for desired properties. For example, certain aspects of the gear 100 may be formed with a first material with microstructures resulting in a first characteristic, such as relative hardness, while other aspects of the gear 100 may be formed with a second material with microstructures resulting in a second characteristic, such as relative toughness. In some examples, at least a third material may be used as a transition between the first and second materials. The third material may be an alloy of the first and second materials or a completely different material. One or more portions of the gear 100 may be formed with a direct energy deposition process in which the materials are melted and solidified into successive layers of the overall 3D structure of the gear 100, as described in greater detail below.

Figure 2:
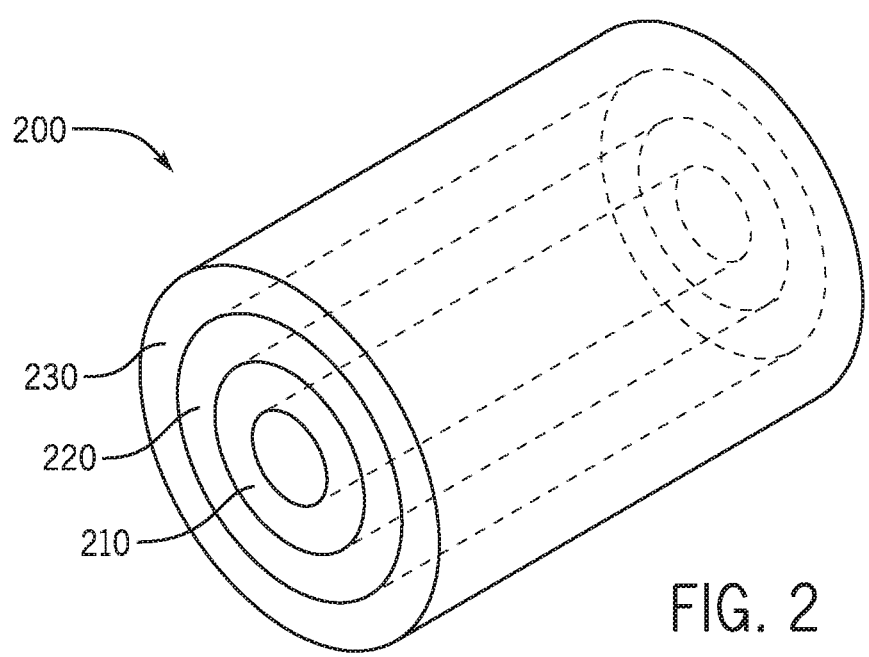
FIG. 2 is a perspective view of an intermediate article used to manufacture the gear of FIG. 1 in accordance with an example embodiment.

FIG. 2 shows an intermediate article 200 that may be used to form the gear 100 of FIG. 1. As shown, the intermediate article 200 is a cylinder that is selectively formed by three material sections or portions 210, 220, 230 arranged coaxial to one another. Although three material sections 210, 220, 230 are depicted in FIG. 2, other examples may have only two material sections or more than three material sections. Moreover, in some examples, the sections 210, 220, 230 may have relationships other than coaxial.

In one example, each material section 210, 220, 230 is formed by a different material. In another example, the material section 210 is formed by a first material, material section 230 is formed by a second material, and material section 220 is formed by an alloy of the first and second materials. In such an example, the material of section 220 may be formed by a predetermined ratio of the first and second material (e.g., 50%/50%) or as a gradient that transitions with varying amounts of the first and second materials. As an example, the gradient may be formed by 100% of the first material at the boundary between sections 210, 220, and in a radial direction transition to 50% of the first material and 50% of the second material at the radial mid-point within section 220, until reaching 100% of the second material at the boundary between sections 220, 230.

As introduced above, one, two, or all three of the material sections 210, 220, 230 may be formed by an additive manufacturing technique of direct energy deposition, particularly a direct energy deposition process technique in which at least one of the material sections 210, 220, 230 is formed by melting and depositing the respective material in a designated location to solidify into the desired shape. For example, section 210 may be cast or formed as a blank or hub from a relatively inexpensive material, and sections 220, 230 may be subsequently formed with direct energy deposition, although any combination is possible. Additional details about the direct energy deposition process are provided below.

Upon formation of the intermediate article 200, the structural features of the gear may be machined or otherwise formed into the appropriate section 210, 220, 230. As one example, teeth (e.g., teeth 110) may be cut into the outermost section 230, thereby resulting in a gear in which the teeth are formed from the material of the outermost section 230, while the other sections 210, 220 are formed from different materials. In another example, teeth (e.g., teeth 110) may be cut into at least portions of the two outermost sections 220, 230, resulting in a gear in which a first portion of the teeth is formed from the material of the section 230 and a second portion of the teeth is formed from the material of section 220.

Although FIG. 2 depicts a cylindrical intermediate article 200 in which teeth are subsequently cut, other examples may initially provide a first intermediate article (e.g., only sections 210, 220) from which teeth or other structural aspects are cut or otherwise formed, and subsequently, additional materials layers (e.g., as section 230) are deposited or otherwise provided to form a further intermediate article. Further examples are discussed below.

Figure 3:
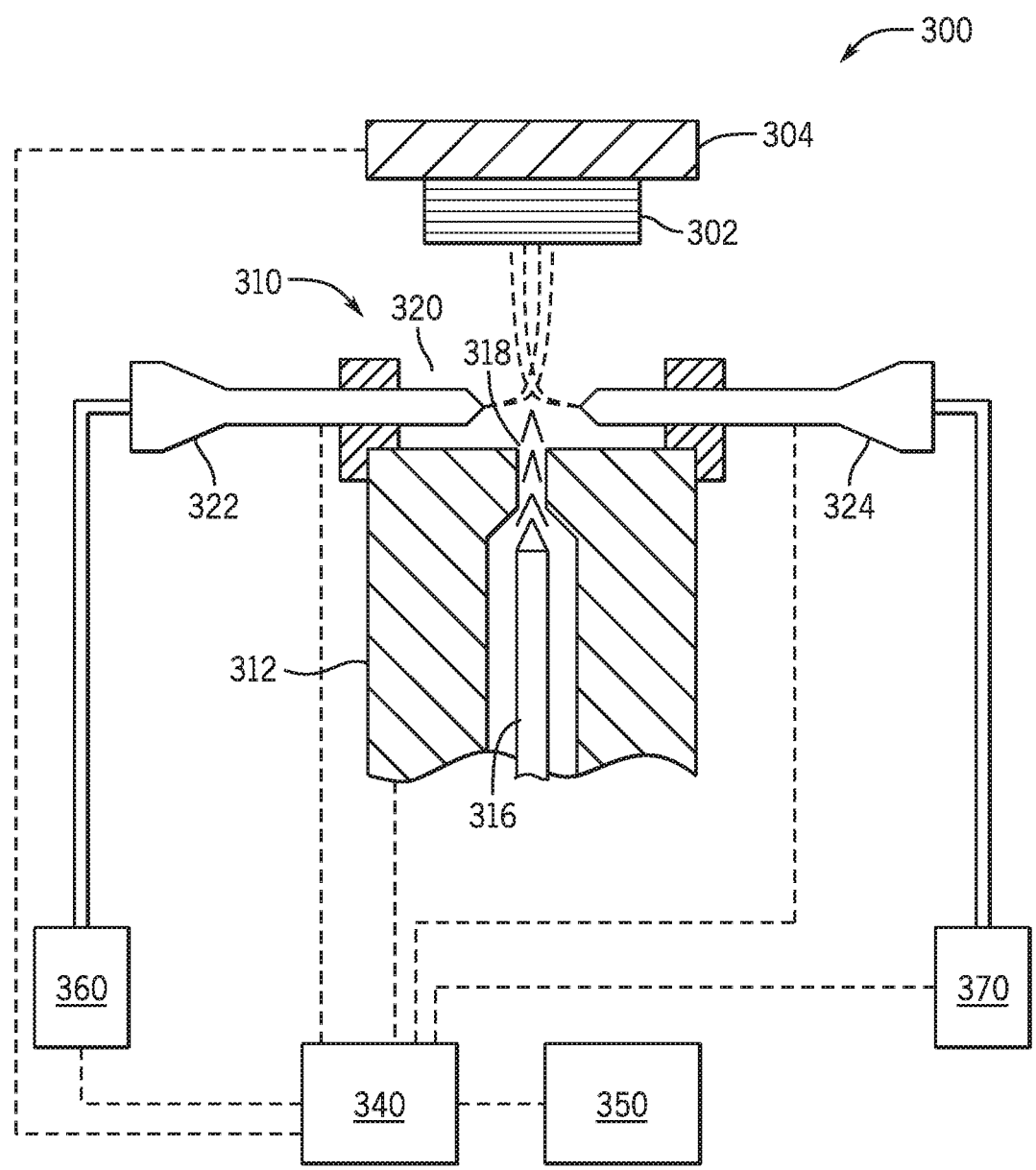
FIG. 3 is a schematic functional block diagram of a system used to manufacture the gear of FIG. 1.

FIG. 3 is a schematic functional block diagram of a system 300 used to manufacture the gear 100 of FIG. 1. In the depicted example, the system 300 is a thermal spray system that uses a direct energy deposition process to form intermediate gear articles out of two or more materials or to deposit the two or more materials on previously formed intermediate gear articles, as described below. Generally, any thermal process in which a heat source is utilized to melt a material in power, wire, or rod form such that the molten or semi-molten material deposited or otherwise provided on an underlying material to quench relatively rapidly and solidify to bond with the surface of the underlying material. One example of a thermal process is the thermal spraying system 300 described below with reference to FIG. 3, although other examples may be provided, including direct metal laser sintering (DMLS).

The system 300 includes a spray or deposition apparatus 310, a controller 340, a user interface (or human-machine interface) 350, and material sources 360, 370 that function to form a deposition layer 302 arranged on a support device 304. As noted above, successive deposition layers 302 form an intermediate gear article (e.g., intermediate article 200), which in turn is finished into a gear (e.g., gear 100).

As shown, the spray apparatus 310 includes a frame element 312 housing an energy source 316. The energy source 316 is arranged proximate to an opening 318 at a chamber 320 arranged on the first end of the frame element 312. In the depicted embodiment, the energy source 316 is a combustion flame in which a fuel and air mixture is ignited and combusted. In other embodiments, the energy source 316 may be in the form of a laser, plasma jet, electron beam, or electrical arc. In any event, the energy source 316 directs energy into the chamber 320 to melt any material in the chamber 320, as discussed below.

First and second material feed devices 322, 324 are arranged proximate to the first end of the frame element 312 to selectively deliver material into the chamber 320. The material feed devices 322, 324 respectively draw or receive material from material sources 360, 370. For example, the first material feed device 322 may operate without the second material feed device 324 such that only the first material is delivered to the chamber 320; the second material feed device 324 may operate without the first material feed device 322 such that only the second material is delivered to the chamber 320; and both material feed devices 322, 324 may simultaneously operate to deliver both materials to the chamber 320 at a predetermined ratio.

The feed devices 322, 324 terminate at nozzles or other forms of outlets that direct the materials into the chamber 320. Typically, the material sources 360, 370 are different materials, selected for desired properties. In one example, the material sources 360, 370 are in the form of powder material, and in further examples, the material sources 360, 370 are in the form of wire material. The feed devices 322, 324 may be configured to deliver the materials in these various forms.

In the chamber 320, the energy source 316 melts the materials exiting the material feed devices 322, 324. The energy source 316 may function as a propellant or a propelling mechanism may be used to direct the melted material out of the chamber 320 such that the resulting spray of melted material is sprayed onto the deposition layer 302. When more than one material is in the chamber 320, the materials are melted together to form an alloy.

The various components of the system 300 are operatively coupled to the controller 340 (or others) to control various aspects of the operation of the system 300. The controller 340 (or others) may be configured as a computing device with associated processor devices and memory architectures, as a hard-wired computing circuit (or circuits), as a programmable circuit, or otherwise. As such, the controller 340 may be configured to execute various computational and control functionality with respect to the system 300 (or other machinery). In some embodiments, the controller 340 may be configured to receive input commands and to interface with an operator via the user interface 350. The user interface 350 may be an input device and an output device and configured in a variety of ways. In some embodiments, the user interface 350 may include one or more joysticks, various switches or levers, one or more buttons, a touchscreen interface that may be overlaid on a display, a keyboard, a speaker, or a microphone associated with a speech recognition system, or various other human-machine interface devices.

In one example, the controller 340 relies upon a design model that may be defined in any suitable manner. For example, the model may be designed with computer aided design (CAD) software. The model may include 3D numeric coordinates of the overall configuration of the deposition layers, intermediate gear article, and gear. In one exemplary embodiment, the model may include a number of successive 2D cross-sectional slices that together form the 3D component. The model may further be defined by the selected material source 360, 370. In particular, the model may define the particular material (e.g., material source 360 or material source 370) or designated combination of materials (e.g., x % of material source 360 and y % of material source 370) for a specified layer or location within a layer.

As such, during operation, the controller 340 provides the appropriate commands to the material sources 360, 370, material feed devices 322, 324, spray apparatus 310, and/or support device 304. For example, based on the model, the controller 340 positions the spray apparatus 310 and/or support device 304 relative to one another such that the chamber 320 is positioned appropriately proximate to the deposition layer 302. The controller 340 commands the material feed devices 322, 324 to deliver the designated amount of each material to the chamber 320 for melting by the energy source 316. More specifically, the speed, position, temperature, and other operating parameters of the energy source 316 are controlled to selectively melt and mix the materials in the chamber 320. The melted materials are directed (e.g., sprayed or otherwise deposited) for solidification on the underlying structures to form the deposition layer 302. The melting and mixing results in a homogeneous alloy of the two or more materials upon solidifying into a solid solution, mixture, or intermetallic compound.

The controller 340 may control the material sources 360, 370, material feed devices 322, 324, spray apparatus 310, and/or support device 304 with respect to axial, radial, and circumferential positions, as well as time. The controller 340 repeats and/or continues to command the components of the system 300 to form successive deposition layers 302 until completion.

As noted above, the materials of the material sources 360, 370 may be selected for particular characteristics, such as enhanced abrasion resistance, strength, durability, toughness, hardness, ability to heat treat, fatigue, ductility, magnetic properties, cost, and useful life. Moreover, the desirability of such characteristics may be a function of location. For example, certain materials may be particularly suitable for surface features, while other materials may be particularly suitable for the inner portions.

Upon formation, subsequent processing steps may be implemented, including cutting, grinding, heat treatments, polishing, and/or solutioning. After one or more of these subsequent steps, in some examples, further direct energy deposition may be employed to form additional layers.

As described above, the direct energy deposition process may be used to form gear elements with various types of structure and material. FIGS. 4-7 are examples of gears 400, 500, 600, 700 that may be formed according to the descriptions herein.

Generally, the thermal spraying process or other direct energy deposition process enables the successive deposition of various materials at desired locations for particularly advantageous characteristics. Moreover, the thermal spraying process enables melting and solidification of two or more materials in desired ratios to result in an alloy with a different collection of characteristics than the base materials. This enables the customization of the chemical composition of targeted gear portions based on desired performance, and is particularly advantageous relative to other gear forming techniques, such as casting, welding, or cold spray processes.

As an example of one combination, a first material (such as bainite) with advantageous toughness characteristics may be used to form inner portions of a gear, a second material (such as martensite) with advantageous surface hardness characteristics may be used to form surface portions of the gear, and a transition alloy material of the first and second materials (or a different material) may be provided between the inner and surface portions to avoid transition issues, particularly during heat treatments. Suitable materials may include, for example, low carbon steel and high carbon steel.

Figure 4:
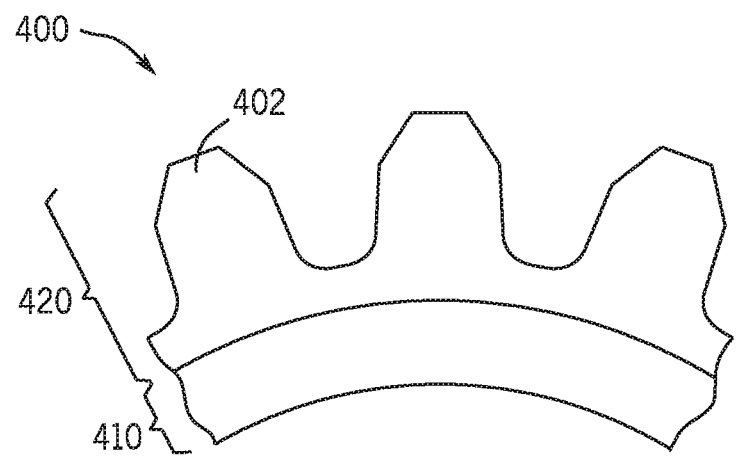
FIGS. 4-7 are detailed views of portions of the gear of FIG. 1 in accordance with various example embodiments.

FIG. 4 is a portion of a gear 400 that includes an inner section or portion 410 and an outer section or portion 420. In this example, the inner and outer sections 410, 420 are formed with different materials with different characteristics. At least the outer section 420 is formed with a direct energy deposition process, such as the thermal spraying process discussed above. As shown, the teeth 402 are formed in the outer section 420.

Figure 5:
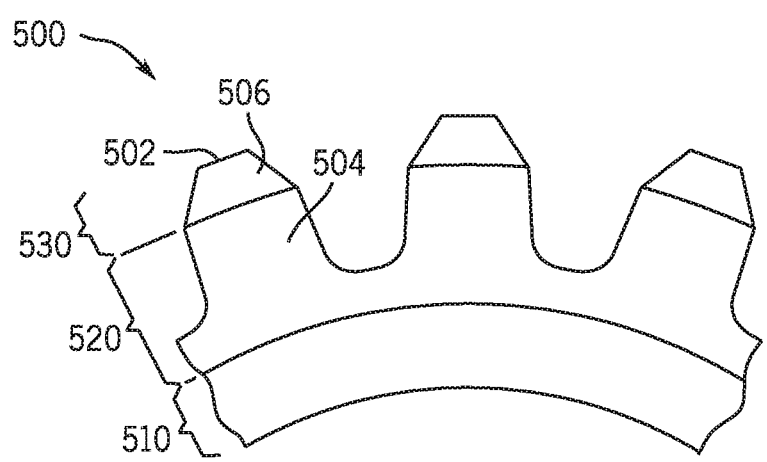

FIG. 5 illustrates a portion of a gear 500 that includes an inner section or portion 510 formed by a first material, an outer section or portion 530 formed by a second material, and an intermediate section or portion 520 formed by a third material. In one example, the third material of the intermediate section 520 is formed by an alloy of the first and second materials. In this example, the teeth 502 are formed such that the addendum 506 is formed in the outer section 530 by the second material and the dedendum 504 is formed in the intermediate section 520 by the third material. The gear 500 may be formed, for example, by using a direct energy deposition process to deposit the intermediate section 520 onto the inner section 510 and outer section 530 onto the intermediate section 520. Subsequently, the teeth 502 are cut into the outer section 530 and the intermediate section 520 at the appropriate depth.

Figure 6:
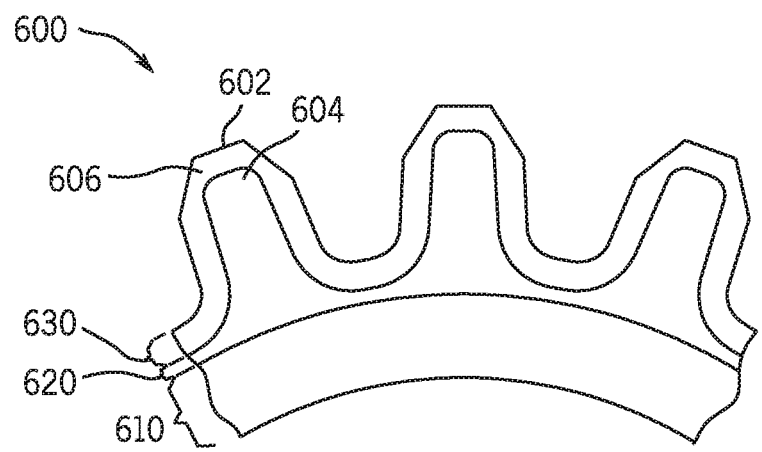

FIG. 6 illustrates a portion of a gear 600 that includes an inner section or portion 610 formed by a first material, an outer section or portion 630 formed by a second material, and an intermediate section or portion 620 formed by a third material. In one example, the third material of the intermediate section 620 is formed by an alloy of the first and second materials. In this example, the teeth 602 are formed such that the tooth surface 606 is formed in the outer section 630 by the second material and the tooth core 604 is formed in the intermediate section 620 by the third material. The gear 600 may be formed, for example, by using a direct energy deposition process to deposit the intermediate section 620 onto the inner section 610. Subsequently, each tooth core 604 is formed in the intermediate section 620. Further, the tooth surface 606 is formed by using a direct energy deposition process to deposit the outer section 630 onto the tooth cores 604 of the intermediate section 620.

Figure 7:
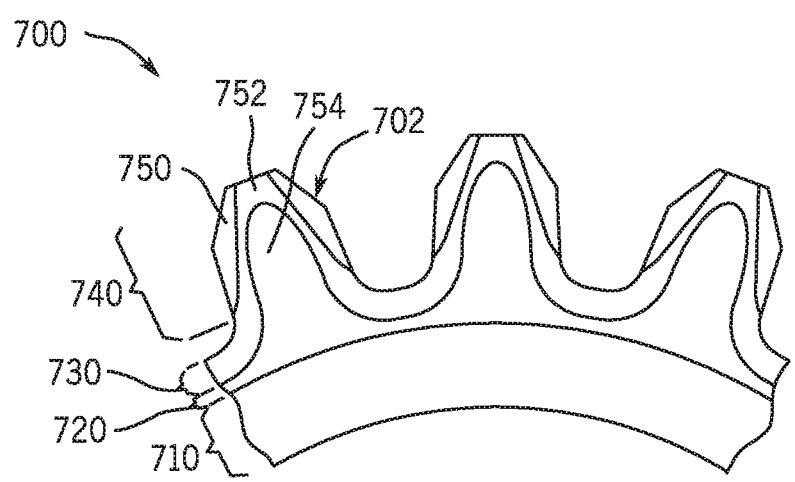

FIG. 7 illustrates a portion of a gear 700 that includes an inner section or portion 710 formed by a first material, an intermediate section or portion 720 formed by a second material, a transition section or portion 730 formed by a third material, and an outer section or portion 740 formed by a fourth material. In one example, the third material of the transition section 730 is formed by an alloy of the second and fourth materials. In this example, the teeth 702 are formed such that a first portion of the tooth surface 750 is formed in the outer section 740, a second portion of the tooth surface 752 is formed in the transition portion 730, and the tooth core 754 is formed in the intermediate section 720 by the third material. The gear 700 may be formed, for example, by using a direct energy deposition process to deposit the intermediate section 720 onto the inner section 710. Subsequently, each tooth core 754 is formed in the intermediate section 720. Further, transition section 730 and outer section 740 are deposited onto the intermediate section 720 such that the first and second portions of the tooth surface 750, 752 may be formed. As such, the various sections 710, 720, 730, 740 may be selected for desired properties in the targeted locations. For example, the material of outer section 740 may be selected for wear resistance, the material of the transition section 730 may be selected for fatigue or ability to heat treat, the material of intermediate section 720 may be selected for ductility or toughness, and the material of inner section 710 may be selected for cost.

Figure 8:
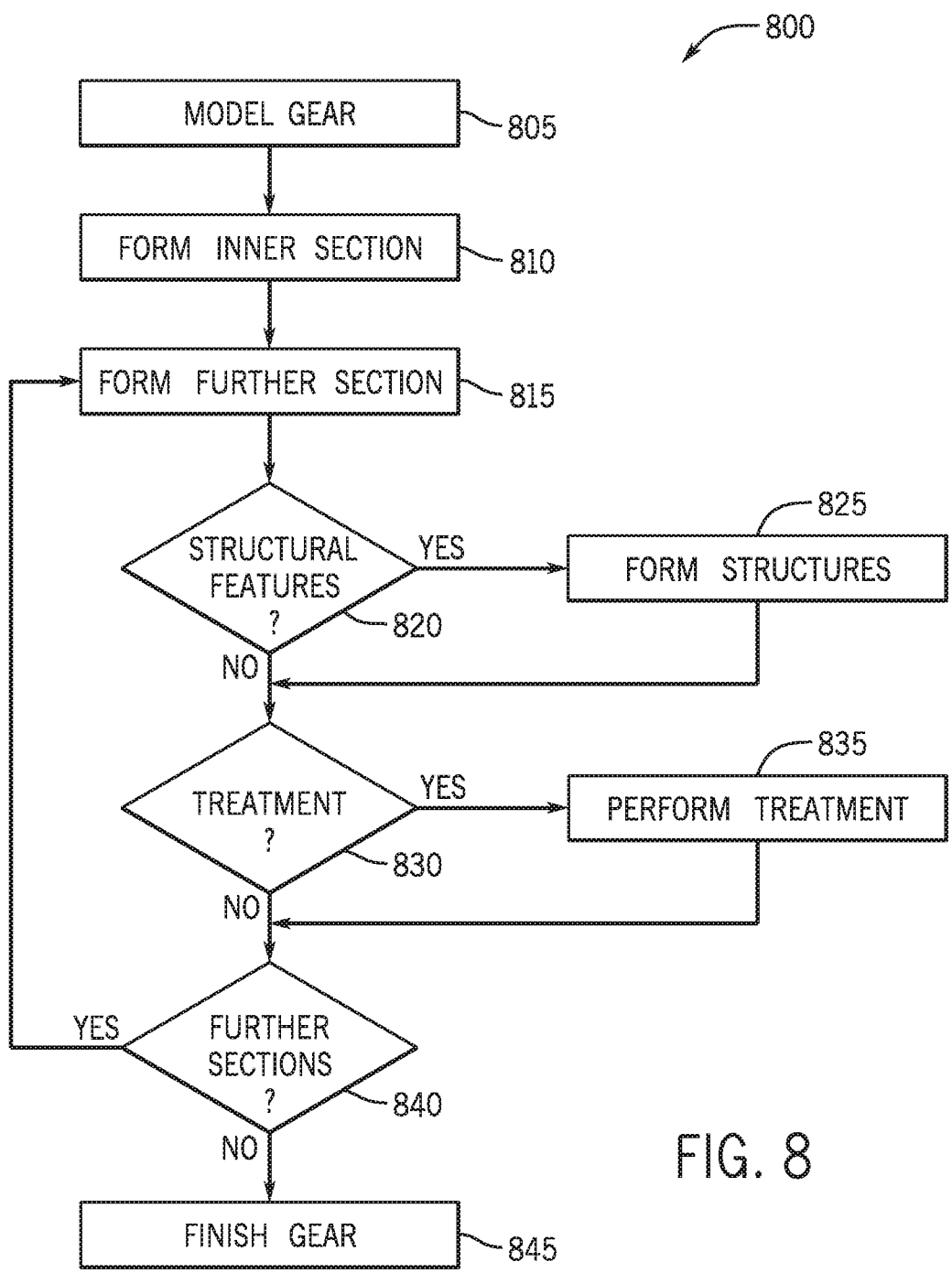
FIG. 8 is a flowchart illustrating a method for manufacturing a bimetallic gear in accordance with an example.

FIG. 8 is a flowchart illustrating a method 800 for manufacturing a composite or multi-material gear (e.g., a bimetallic gear) in accordance with an example. In a first step 805, a model of the bimetallic gear is created that defines the respective locations of the materials used to form the bimetallic gear. In step 810, an inner section of the gear is provided. This section may be a cylinder or blank of a first material that is cast and/or formed using a direct energy deposition process. In step 815, a further section of a different material is formed on a previously formed section, such the inner section (in an initial iteration) and/or a further section (in a subsequent iteration, as described below). In one example, the further section is formed using a direct energy deposition process. In step 820, structural features are evaluated with respect to the current section. In one example, such features may be evaluated in view of the model of step 805. If structural features are appropriate for the current section, the method 800 proceeds to step 825. In step 825, the structural features are formed, for example, by cutting or grinding, and the method 800 proceeds to step 830. If structural features are not appropriate for the current section, the method 800 proceeds to step 830. In step 830, treatment processes are evaluated with respect to the current section. Such treatment processes may include, as an example, heat treatments. In one example, such treatment processes may be evaluated in view of the model of step 805. If a treatment process is appropriate for the current section, the method 800 proceeds to step 825. In step 825, the current section undergoes the treatment process, and the method 800 proceeds to step 830. If treatment processes are not appropriate for the current section, the method 800 proceeds to step 840. In some examples, steps 820,825 and steps 830, 835 may be reversed. In step 840, additional sections are considered. In one example, such additional sections may be evaluated in view of the model of step 805. If no additional sections are necessary, the method 800 proceeds to step 845 in which the gear is completed or otherwise finished. If an additional section is necessary, the method 800 returns to step 815, as described above.

As will be appreciated by one skilled in the art, certain aspects of the disclosed subject matter can be embodied as a method, system, or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A gear comprising:
    a gear body; and
    a plurality of teeth projecting radially outward from the gear body;
    wherein the gear body and the plurality of teeth are formed from at least one intermediate article, the at least one intermediate article having a first section including a first material, a second section including a second material, and a third section including a third material, the first material having a different raw material chemical composition than the second material, at least the second section and the third section being formed by an additive manufacturing technique in which the second material of the second section is melted, deposited and solidified onto the first material of the first section and the third material is melted, deposited and solidified onto the second material of the second section, wherein the second material is an alloy of the first material and the third material;
    wherein the gear body is defined, at least in part, from the first section of the at least one intermediate article;
    wherein the plurality of teeth are defined, at least in part, from the second section and the third section of the at least one intermediate article, including by cutting or grinding the plurality of teeth at least into the second section of the at least one intermediate article.

2. The gear of claim 1, wherein the third material is applied to at least the second section after the plurality of teeth have been cut or ground into the second section of the at least one intermediate article.

3. The gear of claim 2, wherein the plurality of teeth include a fourth section including a fourth material applied to at least the third section by an additive manufacturing technique after the plurality of teeth have been cut or ground into the second section of the at least one intermediate article.

4. The gear of claim 1, wherein the plurality of teeth are defined by cutting or grinding the plurality of teeth into the second section and the third section of the at least one intermediate article.

5. The gear of claim 4, wherein a dedendum of the plurality of teeth is formed of the second material and an addendum of the plurality of teeth is formed of the third material.

6. The gear of claim 4, wherein a core of the plurality of teeth is formed of the second material and a surface portion of the plurality of teeth is formed of the third material.

7. The gear of claim 4, wherein an inner portion of the plurality of teeth are formed in the second material and an outer portion of the plurality of teeth are formed in the third material.

8. The gear of claim 1, wherein the alloy is a homogeneous metallic alloy.

9. The gear of claim 1, wherein the second material is formed by a proportion of the first material and the second material that varies in a radial direction between the first material and the third material.

10. A method of forming a gear, the method comprising:
forming an intermediate article having a first section including a first material, a second section including a second material, and a third section including a third material, the first material having a different raw material chemical composition than the second material, at least the second section and the third section being formed by an additive manufacturing technique in which the second material of the second section is melted, deposited and solidified onto the first material of the first section and the third material is melted, deposited and solidified onto the second material of the second section, wherein the second material is an alloy of the first material and the third material, and wherein the first section, at least in part, defines a gear body; and
defining a plurality of teeth, at least in part, from the second section and the third section of the at least one intermediate article to project radially outward from the gear body, including cutting or grinding at least the second section of the at least one intermediate article.

11. The method of claim 10, wherein the third material is applied to at least the second section after the plurality of teeth have been cut or ground into the second section of the at least one intermediate article.

12. The method of claim 11, further including applying a fourth section including a fourth material to at least the third section by an additive manufacturing technique after the plurality of teeth have been cut or ground into the second section of the at least one intermediate article.

13. The method of claim 10, wherein the plurality of teeth are defined by cutting or grinding the plurality of teeth into the second section and the third section of the at least one intermediate article.

14. The method of claim 10, further comprising:
providing the second material in a powder form.

15. The method of claim 10, wherein the second material includes two different materials each in powder form.

16. The method of claim 10, further comprising:
providing the second material in a wire form.

17. The method of claim 13, further comprising:
prior to applying the second section of the at least one intermediate article to the first section of the at least one intermediate article, melting the second material with at least one of a laser, plasma, an electron beam, and an electric arc.

18. The method of claim 10, wherein the second section of the at least one intermediate article is applied as a proportion of the first material and the third material that varies in a radial direction.

\* \* \* \* \*

UNITED STATES PATENT AND TRADEMARK OFFICE
CERTIFICATE OF CORRECTION

PATENT NO. : 11,248,692 B2
APPLICATION NO. : 15/067767
DATED : February 15, 2022
INVENTOR(S) : John J. White et al.

It is certified that error appears in the above-identified patent and that said Letters Patent is hereby corrected as shown below:

In the Claims

In Column 11, Claim 10, Line 2, delete "an" and insert -- at least one --, therefor.

Signed and Sealed this
Sixteenth Day of August, 2022

Katherine Kelly Vidal
*Director of the United States Patent and Trademark Office*